United States Patent [19]
Amro

[11] Patent Number: 5,699,535
[45] Date of Patent: Dec. 16, 1997

[54] METHOD, MEMORY AND APPARATUS FOR AUTOMATICALLY RESIZING A PLURALITY OF WINDOWS DISPLAYED ON A COMPUTER DISPLAY

[75] Inventor: Hatim Yousef Amro, Austin, Tex.

[73] Assignee: International Business Machines Corporation, Armonk, N.Y.

[21] Appl. No.: 626,214

[22] Filed: Mar. 29, 1996

[51] Int. Cl.⁶ .................................................. G06F 15/00
[52] U.S. Cl. ........................... 395/342; 395/340; 345/127
[58] Field of Search .................................. 395/340, 342; 345/129, 127, 130, 132

[56] References Cited

U.S. PATENT DOCUMENTS

| | | | |
|---|---|---|---|
| 5,060,170 | 10/1991 | Bourgeois et al. | 395/342 |
| 5,062,060 | 10/1991 | Kolnick | 395/339 |
| 5,163,046 | 11/1992 | Hahne et al. | 370/237 |
| 5,263,134 | 11/1993 | Paal et al. | 395/342 |
| 5,394,521 | 2/1995 | Henderson, Jr. et al. | 395/346 |
| 5,434,964 | 7/1995 | Moss et al. | 395/342 |
| 5,450,536 | 9/1995 | Rosenberg et al. | 395/770 |

Primary Examiner—Mark R. Powell
Assistant Examiner—Ba Huynh
Attorney, Agent, or Firm—Diana L. Roberts; Andrew J. Dillon

[57] ABSTRACT

A method, apparatus, and article of manufacture direct a computer system to automatically resize a plurality of open windows displayed on the computer display. The method includes the first step of in response to detecting a command from user controls over a first portion of a displayed window, determining if the displayed window is in a default size or a zoomed out size. The second step includes in response to a second command from user controls, determining if a change in state applies to the plurality of windows. The third step includes if the change in size applies to the plurality of windows and if the displayed window is in the default size, automatically displaying on the computer display the plurality of windows using the zoomed out size. The fourth step includes if the change in size applies to the plurality of windows and if the displayed window is in the zoomed out state, automatically displaying on the computer display the plurality of windows using the default size.

6 Claims, 3 Drawing Sheets

METHOD, MEMORY AND APPARATUS FOR AUTOMATICALLY RESIZING A PLURALITY OF WINDOWS DISPLAYED ON A COMPUTER DISPLAY

CROSS-REFERENCE TO RELATED APPLICATION

The present invention appears to claim subject matter disclosed in prior co-pending application Ser. No. 08/626,197, IBM Docket No. AT9-95-139, filed on Mar. 29, 1996, co-pending application Ser. No. 08/626,219, IBM Docket No. AT9-96-036, filed on Mar. 29, 1996, co-pending application Ser. No. 08/626,196, IBM Docket No. AT9-96-039, filed on Mar. 29, 1996, and co-pending application Ser. No. 08/626,751, IBM Docket No. AT9-96-039, filed on Mar. 29, 1997.

BACKGROUND OF THE INVENTION

1. Field of the Invention

The present invention relates to graphical user interfaces (GUIs) and operating systems of computing systems and, more particularly, but not by way of limitation, to a method, article of manufacture, and apparatus for resizing windows.

2. Background Information and Description of Related Art

Many conventional operating systems, such as the Windows(TM), OS/2(TM), and AIX(TM) operating systems, utilize graphical user interface (GUI) desktop environments to organize computer objects. A GUI allows a user to graphically view and manipulate those objects as icons using a mouse or pointer. Conventional GUIs examine the object's identifier (e.g., name), search a resource file for the identifier, and then display an icon representing the object according to the information stored in the resource file. The resource file contains information about each window, such as any initial value, the default color of the window, the default size of the window, and the window's location on the display screen. Typically, the GUI reads the resource file once per session. When the user double-clicks over an icon, the GUI opens the object (e.g., starts an application), displays a window and contents therein, and automatically transfers focus to that window. When a window receives focus, the GUI transfers all input information, such as key strokes from a keyboard, to the object/application running in that window.

Objects may be simultaneously opened, creating a stack of windows that the GUI displays in a default size and location on the display screen. When the user single clicks over a window not positioned on top of the stack of windows, the GUI transfers focus from the window on the top of the stack to the new window. When a window receives focus, the GUI places that window on top of the stack of windows and, as previously mentioned, queues any key strokes by the user from a keyboard to the object/application running in that window.

Conventional GUIs provide three states for an object—maximized, default, and iconized (i.e., minimized). As previously mentioned, when a user opens a window, the GUI displays the window using a pre-determined size (i.e., a default state) and automatically transfers focus to it. Using a mouse, the user can manually change the predetermined size by adjusting the position of the window's border edges. However, the process of manually resizing the window is tedious and time consuming.

Conventionally, the GUI provides two buttons (please see maximize button 224 and minimize button 226 in FIG. 2) in a window's title bar that allow the user to toggle between a maximized state and an iconized state. When a user maximizes a window, the window occupies all screen real estate, thereby obscuring the view of other windows. On the other hand, the iconized state occupies little space, but does not display the contents of its running application. Obviously, this is a disadvantageous state when the user needs to view the contents of a running application.

Disadvantages and limitations of the above described system occur because the desktop is typically cluttered with many open default windows that occupy large amounts of real estate, preventing the user from viewing several desired windows. For example, if a user desires to cut and paste information from one window into several windows, the user must have those windows open with full view. To do so, the user typically opens each window in a default state and then manually resizes them so that they fit on the display screen. Again, this process is tedious and time consuming.

Accordingly, there is a need for an enhanced user interface that automatically resizes (e.g., reduces the size of) all windows not having focus and, further, allows the user to easily and selectively re-size active windows without iconizing them.

SUMMARY OF THE INVENTION

In accordance with the present invention, a method, apparatus, and article of manufacture direct a computer system to automatically resize a plurality of open windows displayed on the computer display. The method includes the first step of in response to detecting a command from user controls over a first portion of a displayed window, determining if the displayed window is in a default state or a zoomed out state. The second step includes in response to a second command from user controls, determining if a change in state applies to the plurality of windows. The third step includes if the change in state applies to the plurality of windows and if the displayed window is in the default state, automatically displaying on the computer display the plurality of windows using a zoomed out size. The fourth step includes if the change in state to applies to the plurality of windows and if the displayed window is in the zoomed out state, automatically displaying on the computer display the plurality of windows using a default size.

DETAILED DESCRIPTION OF THE PREFERRED EMBODIMENT

The following detailed description is of the best presently contemplated mode for carrying out the invention. However, this detailed description is not to be viewed in a limiting sense, but is made merely for the purpose of illustrating the general principles of the invention, the scope of which is only defined by the appended claims.

Figure 1:
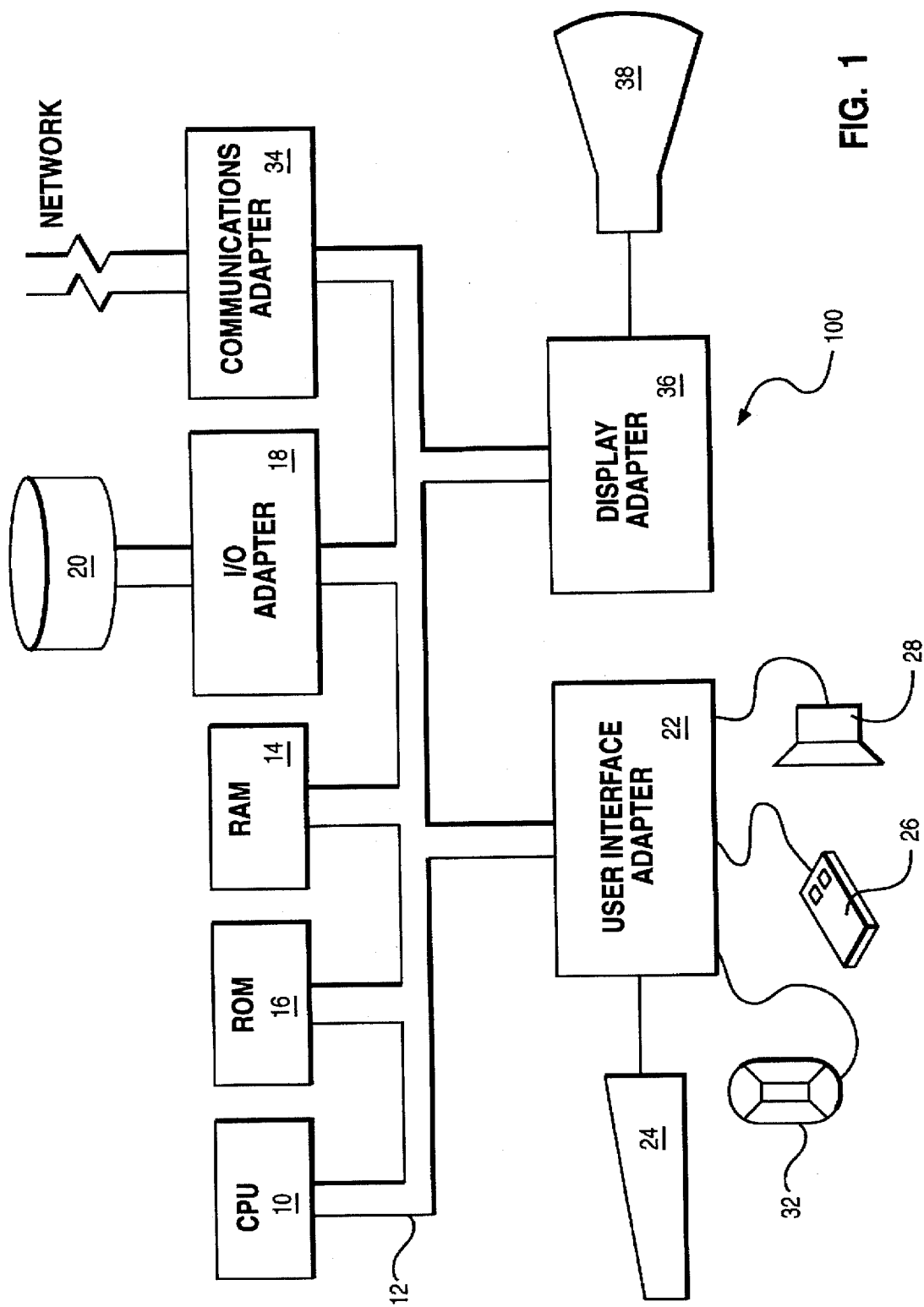
FIG. 1 illustrates a schematic diagram of an example hardware environment for implementing the present invention.

The preferred embodiment may be practiced in any suitable hardware configuration, such as computing system 100 illustrated in FIG. 1 or, alternatively, in a laptop or notepad computing system. Computing system 100 includes any suitable central processing unit 10, such as a standard microprocessor, and any number of other objects interconnected via system bus 12. For purposes of illustration, computing system 100 includes memory, such as read only memory (ROM) 16, random access memory (RAM) 14, and peripheral memory devices (e.g., disk or tape drives 20) connected to system bus 12 via I/O adapter 18. Computing system 100 further includes display adapter 36 for connecting system bus 12 to display device 38. User interface adapter 22 connects system bus 12 to user controls, such as keyboard 24, speaker 28, mouse 26, touchpad 32, or any other user input device (e.g., a touch screen (not shown)).

One skilled in the art readily recognizes how a user utilizes a mouse and mouse cursor to initiate the manipulation of objects in a graphical user interface. For example, a user can drag and drop object icons in a window using a mouse and mouse cursor. Moreover, a user can open and/or close objects by positioning a mouse cursor over the icon and double-clicking one of the mouse's buttons (herein referred to as "double clicking").

A graphical user interface (GUI) of the preferred embodiment resides within a computer-readable media and allows a user to initiate the manipulation of objects. Any suitable computer-readable media my retain the GUI (e.g. windowmanager), such as ROM 16, RAM 14, disk and/or tape drive 20 (e.g., magnetic diskette, magnetic tape, CD-ROM, optical disk, or other suitable storage media). Further, in the preferred embodiment, the GUI interfaces the user to the AIX™ operating system. The GUI may be viewed as being a part of the operating system. Any suitable operating system or desktop environment could be utilized. While the GUI merely instructs and directs CPU 10, for ease in explanation, the GUI will be described as performing the following features and functions.

Figure 2:
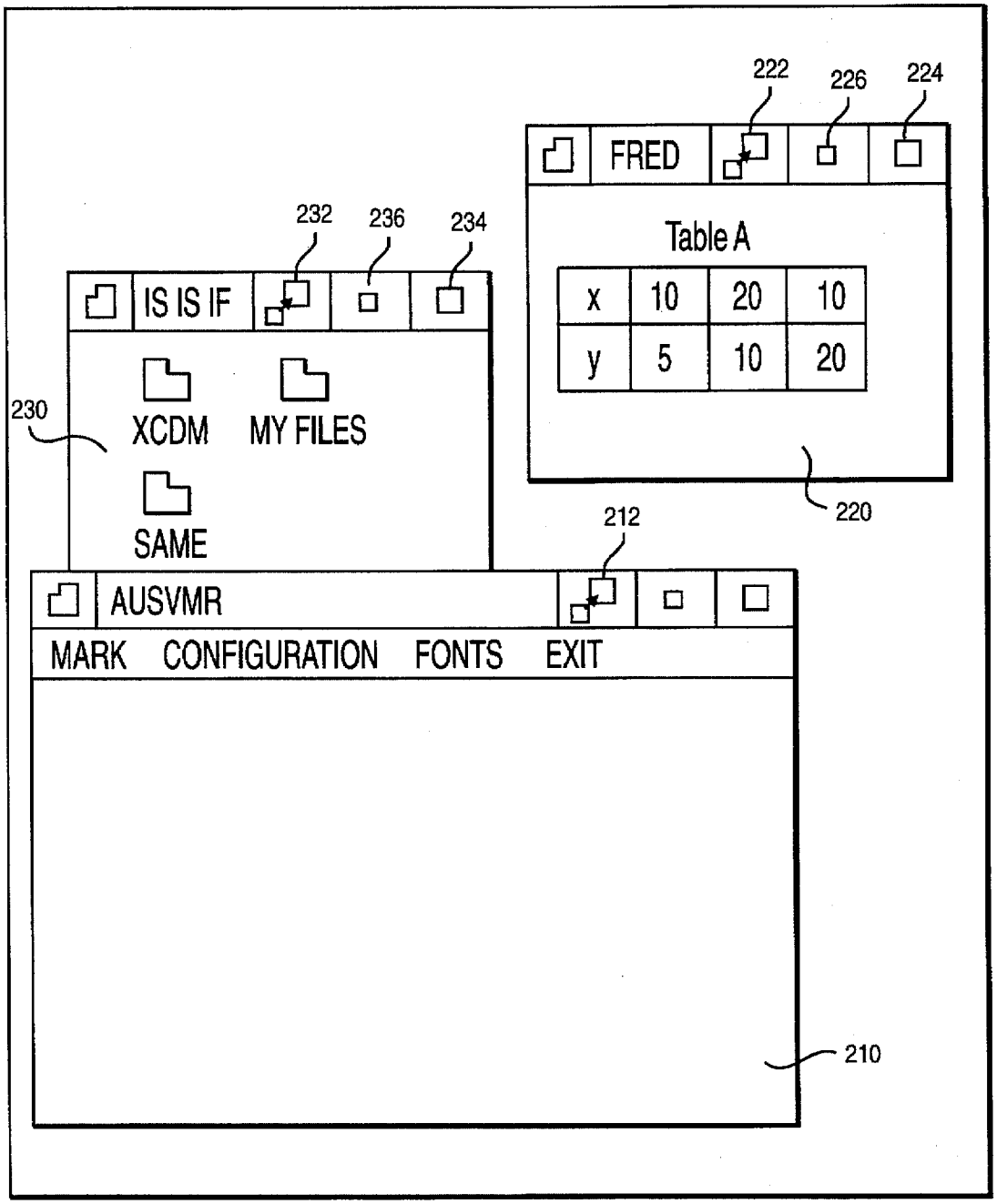
FIG. 2 illustrates a GUI display window for displaying a default window having focus and zoomed out windows.

FIG. 2 illustrates a display screen 200 for displaying various windows according to the preferred embodiment. One skilled in the art readily recognizes that any number of windows could be displayed. Window 210 is in a default state and has focus. Because window 210 has focus, the GUI places it on top of the stack of other windows. However, at the time the GUI passed focus to window 210, the GUI "zoomed out" the window losing focus, if any (e.g., either window 220 or 230). The other window would already have been zoomed out unless the user un-zoomed the window (described herein). Zoomed out windows 220 and 230 are open and continue to display some or all their original contents (i.e., contents displayed in the default state), but their height and width dimensions are automatically reduced in size so that the window occupies less space on display screen 200. In the preferred embodiment, the contents displayed in a zoomed out window are proportionally reduced according to the amount of size reduction of the window. Therefore, the entire window is reduced in size. Alternatively, the contents could remain the original size, and only the dimensions of the window would be reduced, thereby displaying less of the contents.

The percentage of window reduction depends on the size of the display screen, the original size (i.e., default size) of the window at the time immediately before being zoomed out, and the number of windows displayed on the screen. However, there is a minimum and maximum range of reduction, such that a window is never reduced more than 70% or less than 30% The following formula is stored in a system table and is used to calculate the zoomed out height and width of a window.

30%<Zoomed out window height=[(Original window size height)$^2$/Screen size height]*[1+1/(number of windows displayed on the screen)<70%

30%<Zoomed out window width=[(Original window size width)$^2$/Screen size width]*[1+1/(number of windows displayed on the screen)<70%

Windows 210, 220 and 230 each include zoomed out button 212, 222 or 232, respectively, which allow the user to toggle the respective window between the default state and the zoomed out state.

Alternatively, other zoomed out formulas and/or percentages of reduction could be used without departing from the scope of the invention.

Accordingly, the preferred embodiment allows the user to view multiple windows on a screen by automatically zooming out all windows not having focus. Further, the user can selectively toggle a window between the zoomed out state (size) and the default state (size).

Figure 3:
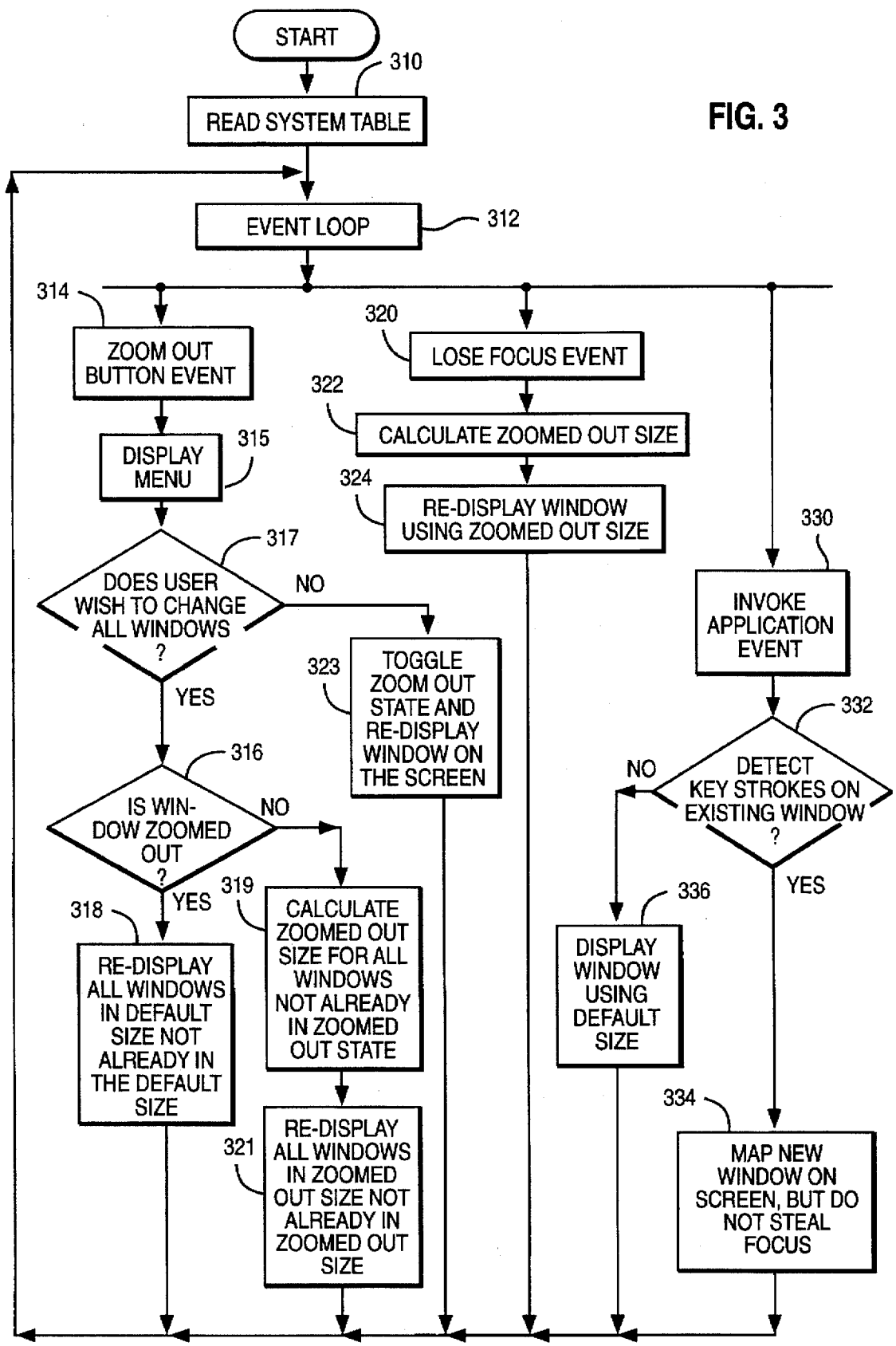
FIG. 3 is a flow chart illustrating detailed logic for implementing the preferred embodiments.

The GUI of the preferred embodiment directs the performance of the steps illustrated in the detailed logic of FIG. 3. At 300, a user or operating system opens a particular object. For example, the user could double click over an icon to open a dynamic link library directory or open a directory containing files from several applications. At 310, the GUI reads a conventional system table previously loaded into RAM 14. The operating system initially builds the system table and continues to update it each time the user adds/changes an object. However, depending on the number of objects, the system table may be a master table for identifying the location of one or more objects. In any event, the system table now contains information needed to zoom and un-zoom any window in that session. For example, the system table includes the zoomed out formulas listed above, whether the zoomed out state of the window has been invoked, whether the window has focus, the size of the window, the zoomed out size, and the location of the left upper corner of the window on the screen. The table below illustrates a system table containing zoomed out information for a 1000 by 1000 pixel display screen:

| | SYSTEM TABLE | | | | |
|---|---|---|---|---|---|
| Objects | Zoomed Out Size | Zoom | Default Size | Focus | Window Loc. |
| Path/Name1 | 333 by 333 | Yes | 500 by 500 | No | 50, 100 |
| Path/Name2 | 120 by 213 | No | 300 by 400 | Yes | 200, 150 |
| Path/Name3 | 120 by 333 | Yes | 300 by 500 | No | 100, 100 |

The GUI reads the values for the selected object in the system table and displays a window defined by those values and the information found in the resource file. Next, at 312, an event loop is processed. At 314, if the GUI detects an event (e.g., mouse click) over a zoomed out button, at 315, the GUI displays a conventional drop down menu asking the user at 317 if the change in zoom out status should apply to all windows. The user answers by clocking over either a yes or no button. If so, at 316, the GUI examines the zoom column of the system table to determine if the window has been zoomed out. If so, at 318, the GUI re-displays all windows using their default sizes and window locations. If not, at 319, the GUI calculates the zoomed out size according to the formula delineated above for each window not currently zoomed out and, at 321, displays each window using the zoomed out size and default window location. Returning to 317, if the change in zoom out status only applies to the current window, at 323, the GUI toggles the zoom out status and re-displays the window in that new status.

At 320, if the GUI detects that a window is losing focus because the user has clicked on another window or opened a new window, at 322, the GUI calculates the zoomed out size for the window losing focus. At 324, the GUI re-displays that window using the zoomed out size. The GUI continues to display that window in a zoomed out state (i.e., size) for that session until the user unzooms (i.e., clicks over its zoomed out button), or until the window regains focus.

At 330, if the GUI detects the user invoking an object/application (e.g., double clicking over an object icon) and, at 332, and if the GUI detects key strokes while the GUI is passing focus to the new window, at 334, the GUI maps the new window to the screen using the default size and window location, but does not transfer focus to the newly opened window until the user clicks on the new window. Otherwise, at 336 the GUI displays the new window using the default size and passes focus to it as it would any newly-opened window.

While the invention has been shown and described with reference to a particular embodiment thereof, it will be understood by those skilled in the art that the foregoing and other changes in form and detail may be made therein without departing from the spirit and scope of the invention.

What is claimed is:

1. A method for directing a computer system, having at least a processor, user controls, memory, and computer display, to automatically resize a plurality of windows displayed on the computer display, comprising the steps of:

in response to detecting a command from user controls over a first portion of a displayed window, determining if the window is in a default size or a zoomed out size;

in response to detecting a second command from user controls over a second portion of the displayed window, determining if a change in size applies to the plurality of windows;

if the change in size applies to the plurality of windows and if the displayed window is in the default size, automatically displaying on the computer display the plurality of windows using the zoomed out size; and if the change in size applies to the plurality of windows and if the displayed window is in the zoomed out size, automatically displaying on the computer display the plurality of windows using the default size.

2. The method according to claim 1 wherein the first portion comprises a zoomed out button.

3. The method according to claim 2 wherein the second portion comprises a drop down menu.

4. The method according to claim 1 wherein the step of displaying on the computer display the plurality of windows in a zoomed out size comprises the steps of:

determining height and width dimensions for each window and the computer display;

squaring the dimensions of the height for each window;

dividing the square of the height by the height of the computer display to create a first resultant for each window;

dividing one by a total number of windows displayed on the computer display and adding one thereto, creating a second resultant; and multiplying the first resultant by the second resultant to create a third resultant for each window;

if the third resultant is greater than 30% of the height of the corresponding window and less than 70% of the height of the corresponding window, assigning the third resultant as the zoom out size for height for the corresponding window;

if the third resultant is less than 30% of the height of the corresponding window, reducing the height of the corresponding window by 70%;

if the third resultant is greater than 70% of the dimensions of the first window, reducing the height of the corresponding window by 30%; and repeating the above steps for the width of each window.

5. A computer system for automatically resizing a plurality of windows, comprising:

a computer display;

user controls;

processor;

in response to detecting a command from the user controls over a first portion of a displayed window, means for determining if the displayed window is in a default size or a zoomed out size;

in response to a second command from user controls over a second portion of the displayed window, means for determining if a change in size applies to the plurality of windows;

if the change in size applies to the plurality of windows and if the displayed window is in the default size, means for automatically displaying on the computer display the plurality of windows using the zoomed out size; and if the change in size to applies to the plurality of windows and if the displayed window is in the zoomed out size, means for automatically displaying on the computer display the plurality of windows using the default size.

6. An article of manufacture, comprising:

a computer usable medium having computer readable program code means embodied therein for directing a computer system, having at least a processor, user controls, key board, and computer display, to automatically resize a plurality of windows displayed on the computer display, the computer usable medium comprising:

in response to detecting a command from the user controls over a first portion of a displayed window, first computer readable program code means for causing the computer system to determine if the displayed window is in a default size or a zoomed out size;

in response to a second command from user controls over a second portion of the displayed window, second computer readable program code means for causing the computer system to determine if a change in size applies to the plurality of windows;

if the change in size applies to the plurality of windows and if the displayed window is in the default size, third computer readable program code means for causing the computer system to automatically display on the computer display the plurality of windows using the zoomed out size; and if the change in state to applies to the plurality of windows and if the displayed window is in the zoomed out size, fourth computer readable program code means for causing the computer system to automatically display on the computer display the plurality of windows using the default size.

* * * * *